United States Patent [19]

Ahrens

[11] 4,250,531
[45] Feb. 10, 1981

[54] SWITCH-ARC PREVENTING CIRCUIT

[76] Inventor: Walter C. Ahrens, 3228 S. 128th Ave., Omaha, Nebr. 68144

[21] Appl. No.: 71,107

[22] Filed: Aug. 30, 1979

[51] Int. Cl.³ .............................................. H02H 7/22
[52] U.S. Cl. ........................................ 361/2; 361/56; 179/18 G; 307/135
[58] Field of Search ................. 361/2, 3, 4, 5, 6, 8, 361/9, 11, 13, 10, 186, 187, 160, 152, 159, 189, 190, 56; 175/15 AT, 27 D, 16 AA, 9, 81 R, 1 A, 18 G; 307/268, 132 R, 132 E, 134, 135

[56] References Cited

U.S. PATENT DOCUMENTS

| | | | |
|---|---|---|---|
| 3,697,704 | 10/1972 | Jacobs | 179/16 AA X |
| 3,786,314 | 1/1974 | Misch | 361/187 X |
| 3,912,941 | 10/1975 | Passarella | 361/2 |
| 3,971,961 | 7/1976 | Inami et al. | 307/268 |
| 4,075,510 | 2/1978 | Pascente | 361/56 X |

Primary Examiner—Patrick R. Salce
Attorney, Agent, or Firm—Hiram A. Sturges

[57] ABSTRACT

A switch-arc preventing continuous current circuit for protecting pulsing contact telephone exchange switches, the circuit having a first transistor in circuit with and controlled by a control transistor, the power electrodes of the first transistor being disposed in circuit between an inductive coil of a stepping solenoid and a protected switch, a bias voltage source connected to a terminal of the protected switch by a blocking diode and a pair of resistors in series, and a metal oxide varistor in shunt across the power electrodes of the first transistor.

4 Claims, 1 Drawing Figure

SWITCH-ARC PREVENTING CIRCUIT

BACKGROUND OF THE INVENTION

Telephone company personnel have said that switch contact maintenance constitutes 50 to 75 percent of central office exchange maintenance.

The type of switch to be protected is called, in telephone terminology a "spring pile-up arrangement", operating in indirect response to a telephone dial and controlling a stepping solenoid, the inductive cost of which is a source of voltage spikes injurious to switch contacts. The term "inductive coil" is telephone terminology to distinguish from a load coil.

Stepping solenoid coils from various manufacturers have varied in their resistances by as much as from 40 to 1800 ohms. The high resistances reduce switch contact current to very low levels as creates special problems and a versatile switch protector circuit has been greatly needed.

Every six months a technician has been required to use extensive instrumentation—operating into thousands of test jacks on the spring-pile-up switches. It was necessary to test each of these switches individually to determine whether the switch was performing to specifications—then fine tuning was required of that switch in order to operate within its prescribed limits of resistance. The switch had to be tuned in such a manner as to operate into the required resistance in a subscriber line.

By use of my invention, as later described, it has been found that it is no longer necessary to fine tune the switches at all. But a single transistor for switch protection will fail, in most telephone exchange uses, causing costly down-time.

When there is a more rapid pulse rate, such as 30 pulses per second, together with high coil resistance in the inductive coil, then a single transistor device will not stand up.

In the prior art, the proposals for the protection of switches in telephone circuitry have included a single transistor circuit, such as shown in the U.S. Pat. No. 3,912,941, issued Oct. 14, 1975, to Thomas M. Passarella, and titled: ISOLATION CIRCUIT FOR ARC REDUCTION IN A DC CIRCUIT.

The single transistor in U.S. Pat. No. 3,912,941 is not protected from thermal failure, from overheating in series with the inductive coil.

In addition to the heating effect that will destroy the transistor, and even before it is destroyed, there are also current problems through the inductive coil, because the transistor is acting as a resistor, and it is reducing the line current from the switch through the coil.

I have discovered that my two-transistor circuit with its control transistor protects the series transistor and prevents overheating, but it also has the effect of maintaining the current through the coil at either zero or else at a specific value—it should not be anything inbetween.

In the past it has been necessary to test switch circuits to see if they will reach the operating limit of the switch, since some switches are 1200 and some are 1900 ohms, for example. But, the surprising discovery with the circuit of this invention is that, even a light contact operation will still give a full current-carrying capacity, hence versatility of use.

Heretofore a light contact operation would cause a chattering switch, one non-functional for carrying a substantial current.

A high coil load on a one-transistor circuit will cause spike trouble, a high resistance coil might be beyond the gain limits of the transistor. In other words, the ratio between the current through the collector to emitter on the one hand, and the base current on the other hand, which is the gain, is too high when the coil is of high resistance, causing thermal failure of the transistor from heating.

A two-transistor cirucuit has never before been used to my knowledge to protect a mechanical switch and, for most telephone exchange repair work, a mere two-transistor circuit will fail to solve certain practical problems as I will explain.

However, my special two-transistor circuit has the advantage that, even with higher coil resistances, the transistor that is in series with the solenoid coil is fully turned on.

One of the important features of my special circuit is that no matter what resistance of the load is, even if the inductive coil load were varied, even so high as to cause a 5-ampere current at the load transistor, yet the current at the switch contacts would be very low, such as eleven milli-amps.

To use such low resistance coils, heat sinks would be needed on the transistor to reduce the current. But by putting heat sinks on the protective circuit, then loads of 5-amps and above can be handled at the transistors, whereby coils of lesser resistance can be handled, also.

But I have also discovered that the use of a mere two-transistor circuit will not work to provide a fail-safe operation in the practical problems involved, and I use a varistor to protect the transistor circuit.

The varistor carries high voltage transients generated in the inductive coil to ground at a voltage lower than the collector-to-emitter breakdown voltage of the transistor. This is important because telephone solenoid coils can cause spikes as high as 100,000 volts.

I have discovered that a silicon carbide varistor can cause faulty operation, probably because it permits leakage current therethrough and that a metal oxide varistor will protect both of the prtoective transistors from current leakages.

Economy is gained, I discovered, by using two common inexpensive transistors in the protective circuit, rather than one carefully selected and more expensive transistor, the economy being an additional benefit above the other discussed advantages.

A particular objective of this invention is to prevent expensive "down-time" on equipment.

Another objective is to provide a means of reducing maintenance on existing equipment which has mechanical switches operating in air by installation on already burned switches and cause them to be useable, as has been proven possible.

It is an object of this invention to provide 100% suppression of contact arc and elimination of tiresome noise in telephone exchanges caused by arcing, giving quiet, peaceful switching; and preventing also such noise from being impressed upon subscriber lines.

The top voltage the coil can generate is held down by the varistor to whatever is the voltage rating of the varistor.

A coil could generate voltage as high as, for example, 1000 volts if the varistor were not in the circuit. But, with a varistor being in the circuit, the coil will generate only as much voltage as the varistor allows it to generate.

In a transistor circuit, without a varistor, the transistor allows the coil to generate however much voltage the rating of the transistor will permit before the transistor breaks down.

The circuit of this invention provides the following advantages:

(1) Doesn't blow up the transistor.
(2) Doesn't slow down or "slug" the coils, the circuit is not slowed down; but, in some prior art installations, this does happen.
(3) Extreme versatility. Works in any such uses.
(4) Reduces noise, by eliminating arcing; total noise is cut by as much as 70%.
(5) Self-protective.

To further explain, a slowed pulsing switch operates fewer times per second, for example, perhaps 20 pulses per second, instead of 30 pulses per second. This is very serious because, in some circuits, while the telephone dial operates at 10 pulses per second, the switch may be forced to operate at 10 pulses between digits on the dial. In other words, the switch goes step, step, step, with each digit on the dial. But when the switch gets to a certain point, it may be required to automatically operate 10 steps between one digit on the dial and the next digit on the dial. This is because the switch is hunting for a vacant line in the telephone system and, if you slow down that switch, then it will not make its required 10 steps before the dial reaches the next digit. This causes the telephone call to not go anywhere. All the caller will hear in the telephone is the beeping tone and he will need to re-dial the call. If in the second dialing he hits the same switch, he will have the same negative results, the same beeping and a call failure again. So it is very important that the circuit not be "slugged", in other words, that the circuit not be slowed down by the introducing in the circuit of a protective device that would slow the switch down.

An advantage of this invention is that the device introduced to protect the circuit will not slow the switch down.

Another cause of difficulty in the prior art is, if a switch will handle 1000 calls per hour, then if that switch is slowed down by as little as 10% so that it will handle only 900 calls an hour, then this results in major disappointments causing telephone officials to be enraged. They had plans to handle 1000 calls with the equipment and 100 of the calls can't even get in. Those answers would not even get a dial tone.

The circuit of this invention likely in use may be subjected to as many as 200,000,000 pulses over a 3-month period because of the coil that really damages an unprotected switch operating in air.

It is a further object of this invention that ohmic matching between subscriber lines and the telephone exchange shall in no manner be unfavorably affected or disturbed by this invention.

It is another object of this invention that a timing square wave shall be faithfully preserved throughout this circuitry, from initiation of the wave as a dial pulse, until complete utilization of the wave has occurred, with no measurable or discernible harmful distortion introduced by the invention.

An objective is to reduce telephone subscriber rates by reducing switch maintenance and replacement costs and by providing, in one easily-installed molded jacket, a complete switch protector of versatile use, eliminating need for very costly special units for each variation in need, and eliminating high inventory costs and problems and ordering problems for quantities of non-versatile units, all this being made simple.

Particularly, it is an objective hereof that required constant current in a stepping-switch inductive coil shall by no means be disturbed due to use of this invention, but shall be preserved.

An important objective is that inductive coil slugging is eliminated due to maintenance of a high enough coil voltage of the inductive coil.

Low currents at switch contacts such as below 5 milli-amps, cause contact oxidation and resistance build-up in the contacts and switch failure, and switches carrying currents above 5 milli-amps are self-cleaning. However, the use of parallel circuits with a wire with an extra resistor in parallel with two resistors in my circuit to get more than 5 milli-amps of current to the switch was unobvious to me for many, many months, and it is a feature not found in the prior art U.S. Pat. No. 3,912,941.

The parallel resistor circuit is extremely necessary when coils in the circuit are above 100 ohms. There are many coils in telephone equipment that are 375 ohms and many even at 1000 ohms, although a lesser percentage of them cause arcing problems.

A further objective is to provide a protector causing the switches to operate more smoothly and quietly, surprisingly, for mechanical reasons also, the main mechanical reason being that there is no oxidation build-up on the contacts interferring with smooth operation, hence achieving further quiet operation.

I have discovered that wave form distortion of dial pulse typical to the prior art is eliminated by this invention due to use of a metal oxide varistor as opposed to silicon carbide varistors of the prior art, and due further to the single device operation of said varistor with a two-transistor circuit. Inductive coil voltage is held high by use of the two-transistor circuit, thus preventing low-voltage discharge and preventing coil slugging. Furthermore, timing of the square wave is preserved intact. The metal oxide varistor operates independently of the inductive coil current, whereas, in the prior art, silicon carbide devices caused clipping of wave form, having voltage varying with current. In telephone embodiment, dial pulses typically constitute an amplitude of 48 volts, a duty cycle of 60% and a repetition rate of up to 30 pps. This invention has performed successfully with its two transistors, not only at reprates of 30 pps., but at a multiple thereof of an order of magnitude of $0.5(10)2$. Whereas a single transistor circuit has performed successfully at such rep rates as 10 pps., and in some instances at much higher rep rates, the two-transistor circuit of this invention is known by the experimental determination of the inventor to be reliably successful at such typical rep rates as 30 pps. and higher.

In a most rigorous and comprehensive longevity study performed upon the invention by a significant public electrical utility cooperative, this invention was found to have a longevity of 25 years, an order of magnitude of $0.5(10)2$ of gain over typical six months maintenance schedule of contacts. From this longevity study, it was determined that contact inspection and fine tuning were not required during the accelerated 25-year test. Furthermore, incorporating the invention in telephone exchange equipments under experimental cognizance of the inventor, it was found that contacts so badly pitted as to be due for replacement were reinstated for indefinitely prolonged longevity upon installation of the invention, eliminating need for replacement and likewise eliminating need for subsequent inspection and fine tuning of pitted contacts, resulting performance being equal to that of new contacts.

In the art, and particularly in telephone embodiment, a plurality of manufacturers produce telephone exchange equipments, each utilizing inductive coils of distinct resistive value per individule manufacturer. It is an imperative requirement in optimum operation, that inductive coil current be either zero, or a specifically rewired value at any and all times, and no other value between such limits. With the control transistor holding the series transistor at saturation, and using a metal oxide varistor as opposed to a silicon carbide one, the foregoing requirement is met.

Thus, it will be seen that circuitry causing inductive coil voltage to be dependent upon coil current, and in fact, enhancing variations in inductive coil current, was a disadvantage in the prior art. Furthermore, rated transistor gain being exceeded in such manner as to cause thermal failure is eliminated by use of the control transistor circuit in all operations wherein pulse repetition rate is above such level as 10 pps. and in all instances where current conditions affecting gain may cause thermal failure. The use of said control transistor circuit thus has far wider range than the use of a single transistor circuit.

Thus, not only are the foregoing specific problems of circuitry performance solved by the invention, but, in addition thereto, the invention is of adequate versatility to be useful regardless of resistive value of said inductive coil, thus enabling a telephone firm to standardize on a single product of this invention for updating of their existing equipments, and not being required to stock a plurality of specific and selected kits tailored to each of many kinds of inductive coils.

SUMMARY OF THE INVENTION

The main goal of this invention is to provide an arc-preventing continuous current circuit for protecting pulsing contact telephone exchange switches, the circuit having a first transistor in circuit with and controlled by a control transistor, a protected switch, an inductive coil of a stepping solenoid, the power electrodes of the first transistor being disposed in circuit between the coil and the protected switch, a bias voltage source connected to a terminal of the protected switch by a blocking diode and a pair of resistors in series, the switch being mechanically operated by a switch control solenoid in circuit with a gating pulse source, the base of the control transistor being connected between the pair of resistors, and a metal oxide varistor in shunt across the power electrodes of the first transistor.

Another goal of this invention is to provide the circuit described with an extra resistor in parallel with the pair of resistors for preventing contact oxidation.

DESCRIPTION OF THE PREFERRED EMBODIMENT

Figure 1:
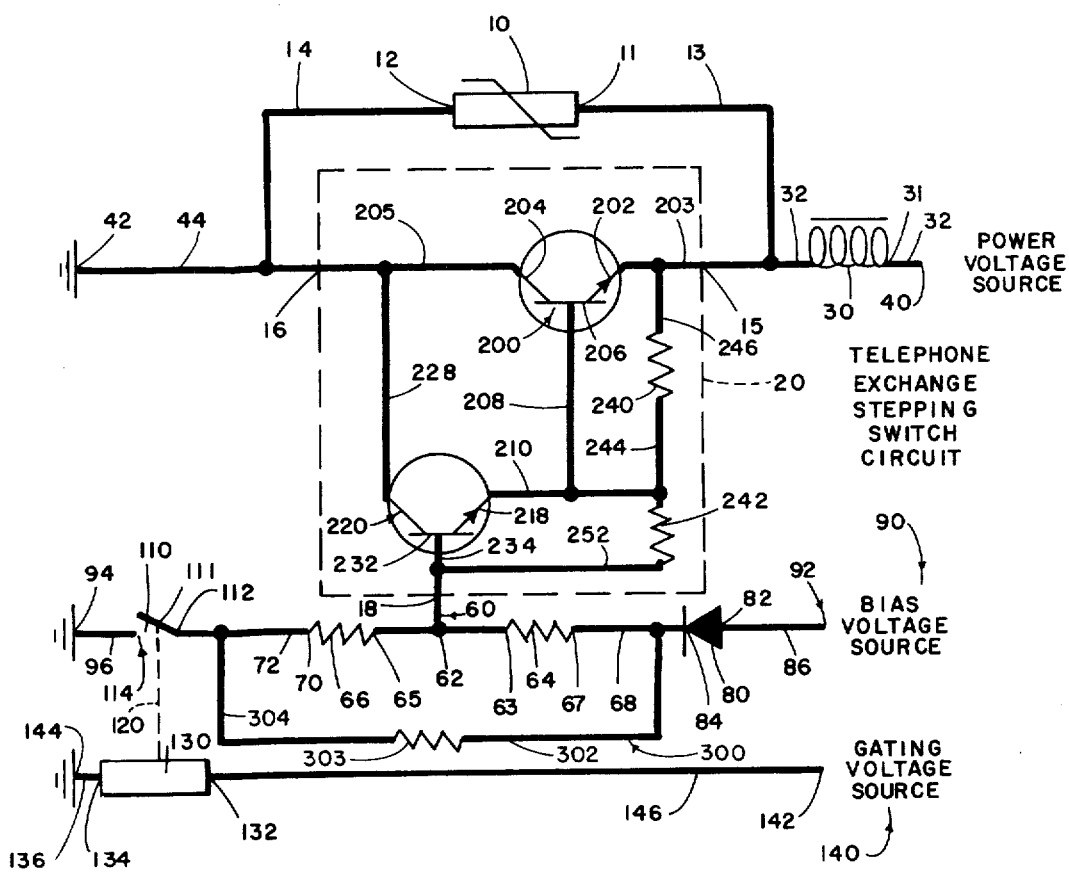
FIG. 1 is a diagram of the arc preventing circuit for telephone net works of this invention, in which a control and series resistor circuit is surrounded by dotted lines.

In FIG. 1 a diagram of the circuit of this invention is there shown, having a varistor 10 which has a first side 11 and a second side 12, and is connected by lines 13 and 14 respectively to a first power electrode terminal 15 and a second power electrode terminal 16 of a three-terminal electronic switch circuit indicated within a dotted rectangular line 20.

The line 13 further attaches the terminal 15 to an inductive coil 30 at a second terminal 32 thereof.

The first terminal 31 of the coil 30 is attached by a line 32 to a first power pole 40 of a continuous current power voltage source.

A second pole of the power voltage source represented by a ground 42, and is attached through a line 44 to the second power terminal 16 of the electronic switch 20.

A gating electrode terminal 18 of the electronic switch 20 is connected through a line 60 to a junction 62 of the second side 63 of a first resistor 64 and to the first side 65 of a second resistor 66.

The first resistor 64 is shown positioned in the drawing to the right of the second resistor 66, and is of much higher resistive value, and of less critical resistive value than the second resistor 66. While a productive tolerance of +20% is of ample quality for the resistor 64, a productive tolerance of +5% is more acceptable for the second resistor 66.

A blocking diode 80 has a second side 84 and is attached by the line 68 to a first side 67 of the resistor 64. A first side 82 of the diode 80 is attached through a line 86 to a bias voltage source 90 at the first terminal 92 of the bias voltage source. The second terminal 94 of the bias voltage source is grounded and is attached through a line 96 to the second make-break contact 114 of a two-terminal switch 110, called the protected switch 110.

A first terminal 112, which is the terminal to the arm 111 of the switch 110, is connected through a line 72 to a second terminal 70 of the second resistor 66. A mechanical linkage 120 operably connects a solenoid 130 to the arm 111.

The solenoid 130 has a first terminal 132 and a second terminal 134. A gating pulse source 140 has a first pole 142 and a second pole 144. The second pole 144 is grounded and attached through a line 136 to the second terminal 134 of the solenoid 130. The first pole 142 is attached through the line 146 to the first terminal 132 of the solenoid 130.

Thus, it will be seen that the total circuitry comprises a power voltage source, a bias source 90, and a gating pulse source 140, each having an independent first pole and a second pole which are commonly grounded.

It will further be seen that these three circuits progress horizontally and geometrically but not necessarily electronically parallel through the schematic drawing of FIG. 1, from right to left.

Those skilled in the art will understand that a gating pulse from the source 140, actuated by a telephone dial, for example, energizes the solenoid 130, drawing the arm 111 to close the contacts 112 and 114 of the two-terminal switch 110, which is a spring pile-up switch, commonly used in telephone exchanges.

Upon closure of the switch 110, the bias source 90 is enabled to provide means for firing the three-element electronic switching means 20. Thus, the power voltage source 50 which is permanently attached in the circuitry, but disabled by quiescent state of the electronic switching means, is now enabled with current flowing through the power circuit between the first pole 40 and the grounded second pole 42 in series with the coil 30.

Inside the transistor switch 20 is a first or load transistor 200 which can be called the series transistor 200 because it is in series with the inductive coil 30.

The first transistor 200 has an emitter 202 connected by wire 203 to the terminal 15, a collector 204 connected by wire 205 to the terminal 16, and a base 206 connected by wires 208 and 210 to the emitter 218 of a second or control transistor 220 which keeps the first or load transistor 200 at full saturation at any time when the protected switch 110 closes.

The control transistor 220 has its collector 224 connected by wire 228 to the wire 205, and its base 232 connected by wire 234 to the terminal 18.

Two resistors 240 and 242 of the electronic switch 20 are connected by a wire 244 and the other end of the transistor 240 is connected by wire 246 to the wire 203.

The other end of the transistor 242 is connected by wire 252 to the wire 234.

For example, with the first transistor at 400 volts rating and the control transistor at about 50 volts rating, then the varistor 10 will protect both transistors.

The second or control transistor 220 is valuable because, if it were absent, then the ratio of the collector current going through the inductive coil to the base current flowing through the protected switch 110 contacts is greater than the specified minimum gain of the first transistor 220 and a heating effect results. In effect, the first transistor 200 would then be overloaded and eventually it suffers thermal failure, and it has the possibility of effect on current through the inductive coil 30, changing that from its fixed value, where it should be maintained constant. But the use of the second transisitor 220 for control avoids these problems of thermal failure causing metal punctures in the first transistor 200 as seen clearly to be from transient pulses experienced when the control transistor 220 is not in the circuit.

The varistor 10 is very valuable because pulse rates of up to 30 pulses a second and higher are experienced in such telephone exchange circuits.

The protected switch 110 operates in air with the advantages of this circuit without resort to vacuum, and so this circuit makes possible installation for the protection of thousands of exchange switches already in use.

This invention has been installed on circuitry in which the mechanical switches have already been burned up to the point where replacement was anticipated, but the pre-existing circuitry was so enhanced by this invention that these burned-out switches were successfully continued in use, as seems to speak well for the value of this invention.

Both the first or series transistor 200 and and the control transistor 220 are NPN, as is imperative.

An anti-oxidation circuit is generally indicated at 300 and comprises a wire 302 connected to the wire 68 between the diode 80 and the first resistor 64. The wire 302 is connected to one side of an extra resistor 303 which has its other side connected by the wire 304 to the wire 72 between the second resistor 66 and the switch 110.

The circuit 300 and its extra resistor 303 is such as to maintain a current through the contact of the switch 110 above 5 milliamps to prevent oxidation of the contacts.

The duty cycle is very low, often about 60% on and 40% off.

Pulse height is a nominal 48 volts. A typical dial pulse is 8 to 12 pps.

The varistor 10 is preferably 400 volts and can be 150–400 volts to take care of the highest voltages.

The power transister or first transistor 200 blocks the other high voltages and is preferably of 400 volts.

Coils can generate as much as 100,000 volts.

The varistor 10 carries high voltage transients generated in the coil to ground at a voltage lower than the collector-to-emitter breakdown voltage of the first or power transistor.

The first resistor 64 has a typical value of 200K with preferred tolerance of ±20%, although 150K is excessively low. The second resistor 66 has a typical value of 91 ohms, with preferred tolerance of ±5%.

There is often 0.2 to 1.0 amperes of current in the inductive coil.

The nominal 48 volts in telephony may be as great as 5.5 volts.

In the prior art, a varistor in parallel with contacts was inferior to my FIG. 1 invention. Likewise, a resistor in parallel to the inductive coil in the prior art was inferior to my FIG. 1 invention.

The lag introduced into the pulsing circuit by the invention of FIG. 1 is less than a micro second and the operating temperature range is 0° C. to 60° C.

The diode 82 is not vital but the circuit is better with it as it chokes off any current flow heading toward the switch and also helps the relay hold a higher speed. It is desirable to hold voltages as high as possible in the coil—otherwise the operation of the relay is slowed down.

I claim:

1. An arc preventing continuous current pulsed electrical circuit for telephone networks which provides substantially self-preserving and switch-preserving characteristics over a broad range of inductive coil resistances comprising: a continuous current power source having first and second poles, a protected two-terminal switch having first and second make-break contacts and means for closing same, an inductive coil of a stepping solenoid of a telephone exchange circuit system, gating means comprising a gating pulse source having first and second poles, biasing means comprising a biasing voltage source having first and second terminals, means for closing said protected switch comprising a pulsed-continuous-current solenoid, a gating pulse source of a telephone exchange and having first and second poles, said pulsed-continuous-current solenoid having a controlling mechanical linkage with said protected switch, means connecting said first pole of said gating pulse source to a first terminal of said pulsed-continuous-current solenoid, and means connecting a second terminal of said solenoid to said second pole of said gating pulse source, a protective two transistor electronic switching means comprising a first transistor having first and second power electrodes, and a control transistor in controlling circuit with said first transistor, said first pole of said continuous current power source being connected to a first side of said coil, said coil having a second side connected to said first power electrode of said first transistor, means connecting said second power electrode of said first transistor to said second pole of said power source, a blocking diode having first and second electrodes, means connecting said first terminal of said bias voltage source to said first electrode of said blocking diode, a voltage dividing resistor network having first and second resistors each having first and second non-polarized sides, said first resistor being of much higher resistance than said second resistor, said first side of said first resistor being connected to said second electrode of said blocking diode, a conductor connecting said second side of said first resistor to the first side of said second resistor, means connecting said conductor to the base of said control transistor, said second side of said second resistor being connected to said first contact of said protected switch, means connecting said second contact of said protected switch to said second terminal of said bias voltage source, a metal oxide varistor having first and second poles, means connecting said first pole of said varistor to said first power electrode of said protective switching means, means connecting said second pole of said varistor to said second power electrode of said protective switching means, whereby arcing is non-existant of said contacts of said protected switching means, and whereby said circuit is sensitive to operate on very low current whereby it is versatile to operate over a broad range of coil resistances.

2. The arc preventing circuit of claim 1 having an anti-oxidation circuit comprising an extra resistor having one side connected to said first side of said first resistor, said extra resistor having a second side connected to said second contact of said protected switch, said anti-oxidation circuit being capable of maintaining a current through said contacts sufficient to deter oxidation of said contacts and lesser than the current reaching said contacts from said second resistor.

3. The arc preventing circuit of claim 2 having the current maintainance ability of said anti-oxidation circuit being sufficient to substantially prevent oxidation of said contacts.

4. The arc preventing circuit of claim 2 having the current maintainance ability of said anti-oxidation circuit being at least approximately 5 milliamps.

* * * * *